(12) United States Patent
Bielby et al.

(10) Patent No.: US 11,894,868 B2
(45) Date of Patent: Feb. 6, 2024

(54) PROGRAMMABLE SPREAD SPECTRUM SIGNALING OVER A PIN OF AN INTEGRATED CIRCUIT DEVICE

(71) Applicant: Micron Technology, Inc., Boise, ID (US)

(72) Inventors: Robert Richard Noel Bielby, Placerville, CA (US); Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 40 days.

(21) Appl. No.: 17/463,384

(22) Filed: Aug. 31, 2021

(65) Prior Publication Data

US 2023/0066816 A1    Mar. 2, 2023

(51) Int. Cl.
*H04B 1/00*      (2006.01)
*H04B 1/69*      (2011.01)

(52) U.S. Cl.
CPC ...................... *H04B 1/69* (2013.01)

(58) Field of Classification Search
CPC ........................................................ H04B 1/69
USPC ........................................................ 375/130
See application file for complete search history.

(56) References Cited

U.S. PATENT DOCUMENTS

| | | | |
|---|---|---|---|
| 2014/0321257 A1* | 10/2014 | Hsueh | H04B 1/7103 370/201 |
| 2016/0188245 A1* | 6/2016 | Thadi Suryaprakash | G06F 1/3296 710/13 |
| 2020/0365225 A1* | 11/2020 | Na | G11C 29/38 |
| 2022/0365135 A1* | 11/2022 | Faure | G01R 31/31725 |

FOREIGN PATENT DOCUMENTS

WO      WO 9633478 A1 * 10/1996

* cited by examiner

*Primary Examiner* — Helene E Tayong
(74) *Attorney, Agent, or Firm* — Greenberg Traurig

(57) ABSTRACT

A device having a plurality of pins configured to connect circuits within an integrated circuit package to circuits outside of the integrated circuit package. A driver enclosed within the package is programmable to generate a spread spectrum signal to represent data being transmitted from a pin of the device. Frequency distribution of the signal spreading over a bandwidth in a frequency domain can be programmed to customize the electromagnetic emission caused by the communication of data through the pin. The frequency spreading can be programmed to reduce energy consumption, electromagnetic interference, and/or errors in receiving the data transmitted via the pin. The settings can be programmed into registers enclosed in the integrated circuit package to control the driver and/or dynamically adjusted using an artificial intelligent engine to optimize a cost function.

20 Claims, 7 Drawing Sheets

PROGRAMMABLE SPREAD SPECTRUM SIGNALING OVER A PIN OF AN INTEGRATED CIRCUIT DEVICE

TECHNICAL FIELD

At least some embodiments disclosed herein relate to memory systems in general and more particularly, but not limited to techniques to control the spectrum of signals driven at a pin of a memory chip.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
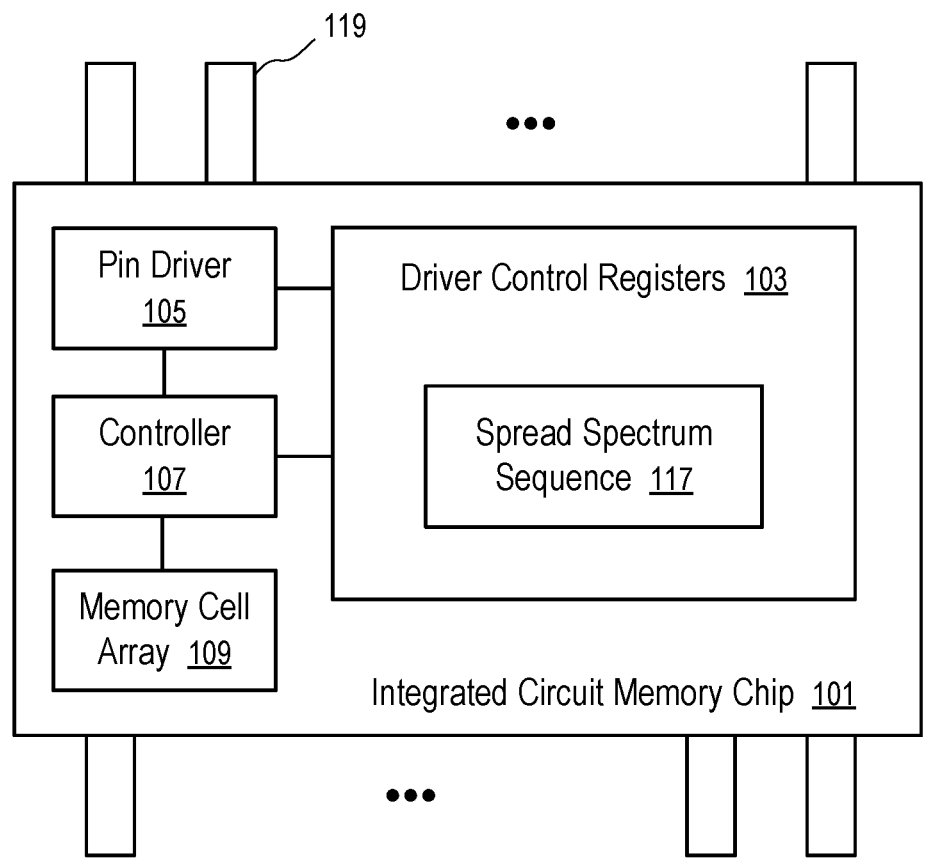
FIG. 1 shows an integrated circuit memory chip having programmable registers configured to control characteristics of signals driven on pins of the chip according to one embodiment.

At least some aspects of the present disclosure are directed to an integrated circuit memory chip having a pin driven to provide signals with a programmable spectrum.

Wide data buses (e.g., 256 bits or greater) are becoming commonplace as the industry is gravitating towards computational performance that is growing to more than tera operations per second. A typical way to manage and reduce the radiated emissions from these large buses relies upon the designs of printed circuit board (PCB) layout and/or deployment of metal shielding in order to keep the peak level of radiated emissions at an acceptable level. To control the electromagnetic radiation or emission from a wide data bus, increased layers of printed circuit board (PCB) may be used. As the data buses become wider, the cost for the typical approach to limit electromagnetic radiation or emission increases.

At least some aspects of the present disclosure address the above and other deficiencies and/or challenges by controlling the spectrum characteristics of signals driven onto a pin for communications between the circuits within an integrated circuit memory chip and circuits outside of the memory chip. To limit the peak electromagnetic radiation at a particular frequency, the signal transmitted from a pin of an integrated circuit memory chip can be configured to spread its frequencies in a wider frequency band. Even when the overall energy of the signal remains the same, the energy at a given frequency of interest is reduced in direct correlation to the amount of the spreading signal that is mixed with the primary signal.

For example, a clock signal used to generate and/or drive an output signal on a pin to represent a data bit can be modified from being at a substantially fixed frequency to a signal is based upon a spread spectrum. Using the spread spectrum signal on the pin can be very effective in reducing Electromagnetic Interference (EMI) EMI levels.

Optionally, an Artificial Intelligence engine can be used to learn and/or apply a custom sequence of spectrum for the pin signal to optimize the performance of the system as a whole, in reducing energy consumption, Electromagnetic Interference (EMI), and/or data transmission errors. For example, a spread spectrum sequencing engine can be configured to generate a spread spectrum pin signal according to a setting of spectrum sequence. The Artificial Intelligence engine can generate different spectrum sequences during a training period. The effects of the different spectrum sequences can be measured, such as the energy consumption use for the pin signals, electromagnetic emissions at selected locations in a system, data error rates in receivers connected to recover data transmitted via the spread spectrum sequences, etc. A cost function can be used to evaluate the performance level of the effects and identify optimized spectrum sequences under various operating conditions, such as temperature, patterns of data being transmitted, etc. Subsequently, the trained model of the Artificial Intelligence engine (e.g., an artificial neural network) can predict the optimized spectrum sequences for the current operating condition of the system.

In general, it is a challenge to design a memory chip that works well in various environments for interfacing with different host devices and/or bus loads. A traditional memory device uses an output buffer with a fixed drive strength to generate output signals at its pins. Such a device can deliver either too much drive strength to a given output, or an insufficient level. When an input/output buffer delivers too much drive strength relative to the requisite load, the resulting signal at the load can experience overshoot, leading to excessive amounts of radiated emissions and Electromagnetic Interference (EMI). Managing Electromagnetic Interference (EMI) at a system level without the ability to reduce the drive strength can be quite complex and cumbersome, leading to modifications in the Printed Circuit Board (PCB) path between the driving device and the receiving device. In the process of modifying the layout of Printed Circuit Board (PCB) to address one offending transmission line, there is an equivalent opportunity to affect a different transmission line/PCB trace as a fallout of the re-routing exercise for the Printed Circuit Board (PCB). When the driving signal is under-powered, a similar exercise of addressing the PCB layout is undertaken with the same potential consequences as seen in the case of addressing the previous, overdrive case.

In addition to use spread spectrum signals on a pin, a programmable driver can be used to customize other aspects of signals delivered via the pin, such as the strength of a pin signal, the delay of the pin signal relative to a clock signal, the slew rate of the pin signal, etc. Thus, the driver can be programmed to drive a pin signal that generates best results in a particular application/environment.

For example, a programmable driver can be configured in a memory chip to drive the signal on a pin based on user programmed parameters. The programmable parameters can be selected to achieve optimized results in a particular system in which the memory chip is installed and/or based on user-defined objectives for the system.

Optionally, the programmable driver can be adjusted continuously to adapt to the operating condition of the memory chip and the system in which the memory chip is installed.

For example, an Artificial Intelligence (AI) engine can be used to determine, based on measured environment parameters (e.g., temperature, input/output activity pattern), the optimized drive strength aligned to a desired cost function. The cost function can be configured to implement trade-off between radiated Electromagnetic Interference (EMI) and signal integrity, where downstream Error Correction Code (ECC) is used to offset the impact of a somewhat degenerated signaling level. The Artificial Intelligence (AI) engine can optionally inspect data patterns across a set of output pins of a memory chip and use machine learning to modulate the current drive strength accordingly.

Optionally, not only the driving strength of the driver of a pin is programmable, other aspects or characteristics of the signal driven on the pin by the driver can also be programmable, such as delay, slew rate, etc.

For example, signal delay can be used to manage Electromagnetic Interference (EMI). Electromagnetic Interference (EMI) emissions are at their greatest when all outputs of a given device are simultaneously switching. Applying different delays to different pins can prevent simultaneously switching and reduce the magnitude of maximum peak Electromagnetic Interference (EMI) emissions. Staggering the timing of the output signals in time on a pin-by-by basis through the addition of a programmable delay can reduce radiated EMI considerably.

Like the programmable drive strength, the user can either program a fixed delay on a pin-by-pin basis or use an Artificial Intelligence (AI) engine to determine optimized delay based on a desired cost function.

Optionally, the programmable output delay can be used to offset the skew associated with routing of large buses across a Printed Circuit Board (PCB) while trying to achieve uniform timing across that bus. To achieve uniform timing Without a programmable output delay on a pin-by-pin basis, it is possible to achieve the uniform timing by matching effective trace lengths on Printed Circuit Board (PCB) layout with a high degree of accuracy. As the system level clock frequencies continue to increase and the bus width of associated buses increases, the challenge and cost of aligning Printed Circuit Board (PCB) traces with a high degree of accuracy increases tremendously.

Programmable slew rate can also be used to address Electromagnetic Interference (EMI). While a buffer with a high slew rate leads to a very fast "clock to output" response time, it comes at the expense of a very high differential voltage (change in voltage vs. time) which also leads to a high level of radiated emissions. Reducing the slew rate can reduce Electromagnetic Interference (EMI).

For example, a programmable drive circuit can contain a series of taps that are configured to correspond to a given slew rate.

Similar to the use of programmable drive strength and programmable output delay, an Artificial Intelligence (AI) engine can be used to control the slew rate that is optimized for a particular application and/or system in which the memory chip is installed.

The programmable driver of pins can be used not only for integrated circuit memory chips, but also in integrated circuit chips having deep learning accelerators, System on a Chip (SoC), etc., that have very large buses (256 bits wide), which can be unwieldy when managing EMI and overall signal integrity.

Implementing the programmable pin driver within the integrated circuit package can greatly simplify the cost associated with system integration on a Printed Circuit Board (PCB). In many cases, Electromagnetic Interference (EMI) management without such solutions can lead to the addition of expensive metal shielding in order to reduce radiated emissions to a level allowed by standards and/or regulations related to Electromagnetic Interference (EMI) and/or electromagnetic compatibility (EMC).

In general, a programmable pin driver can be used to drive signals on a pin of an integrated circuit chip. The characteristics of signals driven on the pin by the driver can be adjusted for best operations in a particular environment, a particular system, a particular application, and/or a particular time period of activities.

For example, the driver strength can be programmed to reduce energy consumption without compromising the ability of the host system to accurately interpret the signals from the pin.

For example, the drive strength of the signal on a pin can be selected from a number of fixed taps for improved interoperability and/or compatibility with a particular host system. The selection can be configured via user programming a register in the integrated circuit chip or via automatic determination using an Artificial Intelligence (AI) engine based on a predetermined cost function.

For example, the drive strength of the signal on a pin can be adjusted via the setting in the registers configured in the integrated circuit chip. For example, the integrated circuit chip can have a programming mode in which the signals on a pin is changed in increments. When a desirable drive strength is applied on the pin, the host system can send a signal to accept the drive strength; and in response the integrated circuit chip stores the current setting of the drive strength for the pin in a non-volatile memory in the integrated circuit chip. Alternatively, the host system can send a command to set the content of the register. For example, the register can be accessible at a predetermined memory address; and the host system can write the setting for the register using a write command that identifies the memory address.

For example, the registers can store settings to control other aspects of signaling characteristics on a pin, such as delay, slew rate, signaling, etc.

Optionally, separate registers can be configured to control individual pins.

Alternatively, pins can be grouped and controlled by respective sets of registers.

In some implementations, an Artificial Intelligence (AI) engine is configured to dynamically adjust the settings of the driver control registers based on sensor data and/or operating condition parameters, such as measured Electromagnetic Interference (EMI) in the system, errors and/or bit error rate detected using an Error Correction Code technique in the data transmitted via the pin signals, system level data error and/or data correction flags, etc.

FIG. 1 shows an integrated circuit memory chip 101 having programmable registers 103 configured to control characteristics of signals driven on pins (e.g., 119) of the chip according to one embodiment.

The integrated circuit memory chip 101 is enclosed in an integrated circuit package. The integrated circuit memory chip 101 has one or more memory cell arrays (e.g., 109) formed on one or more integrated circuit dies. The circuits in the integrated circuit memory chip 101 interact with circuits outside of the integrated circuit memory chip 101 through pins (e.g., 119). In some implementations, the pins can be in the form of ball grid array (BGA). For example, the integrated circuit memory chip 101 can be a grid array (BGA) solid state drive (SSD).

The integrated circuit memory chip 101 includes a pin driver 105 configured to drive signals provided on a pin 119. A controller 107 instructs the pin driver 105 to provide signals representative of data stored in the memory cell array 109.

In addition to provide the signals on the pin 119 that are representative of the data stored in the memory cell array 109, the pin driver 105 can be controlled by driver control registers 103 to adjust aspects of the pin signals. While the pin signals are determined by, and thus representative of, the data stored in the memory cell array 109, the adjustable aspects of the pin signals are relevant to the communications of the signals to a receiving device of the signals such that the data represented by the signals can be recovered with reduced energy consumption and/or reduced Electromagnetic Interference (EMI), without errors or without excessive errors that cannot be corrected via an Error Correction Code (ECC) technique.

For example, the aspects of the signals customizable to reduce Electromagnetic Interference (EMI) can include the frequency spectrum characteristics of the signals.

In general, spread spectrum is a technique to deliberately spread the frequencies of a signal in a particular bandwidth in a frequency domain, resulting in the signal having a wider bandwidth in the frequency domain.

In FIG. 1, the pin driver 105 is programmable to drive a spread spectrum signal on the pin 119 to transmit data according to a spread spectrum sequence 117 identified in the driver control registers 103. At least some frequency spectrum characteristics of the pin signal driven by the pin driver 105 are based on the spread spectrum sequence 117. Different data can be stored in the registers 103 to identify different spread spectrum sequences; and the pin signal driven by the pin driver 105 onto the pin 119 has frequency spectrum characteristics identified and/or represented by the spread spectrum sequence 117 currently stored in the driver control registers 103.

Optionally, individual pins (e.g., 119) can have different registers configured to specify their respective spread spectrum sequences (e.g., 117). Each pin (e.g., 119) can have a unique and/or separate spread spectrum sequence (e.g., 117).

Alternatively, a group of pins (e.g., 119) can share a same spread spectrum sequence (e.g., 117). When pins (e.g., 119) in the group are transmitting the same data, their signals are generated according to the same spread spectrum sequence (e.g., 117) and thus have the substantially the same frequency spectrum characteristics.

Optionally, the pin 119 of the integrated circuit memory chip 101 can be configured to provide a high-speed serial link to another device. Spread spectrum signals can be driven on to the pin 119 to represent data being transmitted through the pin 119. Such a link can provide a high communication bandwidth to its host. Multiple serial links can be used for parallel connections to multiple hosts, or for improved bandwidth to a host. For example, different spread spectrum characteristics can be used to represent different data being transmitted; and encoding data into the spread spectrum signals can increase the communication bandwidth of the pin 119.

Optionally, an Artificial Intelligence (AI) Engine can be configured to observe or monitor effects of using different spread spectrum sequences over time under different operating conditions and predict optimal spread spectrum sequences to minimize electromagnetic emissions and/or error rate in data transmission for the current operating condition.

Optionally, the pin driver 105 can also be programmed to adjust other aspects of the signals driven onto the pin 119, such as signal strength, delay, and/or slew rate.

For example, the strength of the signals driven on the pin 119 by the pin driver 105 can be controlled by one of the driver control registers 103 storing in indication of the customized strength for pin 119. The adjustment of the strength does not change the data represented by the pin driver 105, but can have impact on the Electromagnetic Interference (EMI) associated with signals provided on the pin 119, the energy consumption in providing the signals through the pin 119, and the probability of the signals being incorrectly interpreted by a receiving device connected to the pin 119.

For example, another of the driver control registers 103 can be used to specify a delay of the provision of the signals on the pin 119 relative to a reference signal, such as a clock signal.

For example, a further one of the driver control registers 103 can be used to specify a slew rate of signals driven by the pin driver 105. The slew rate determines the time period between the pin driver 105 starting to drive a signal on the pin 119 and the signal on the pin 119 reaching the strength.

Individual pins (e.g., 119) can have separate registers to control their signal aspects, such as spread spectrum sequence 117, strength, delay, slew rate, etc. Optionally, the pins (e.g., 119) of the integrated circuit memory chip 101 can be organized in groups; and pins in a group can share a register for specifying one of the aspects (e.g., strength, delay, or slew rate).

Optionally, the driver control registers 103 are accessible via addresses specified using signals applied on address pins of the integrated circuit memory chip 101. Thus, a host system can program the driver control registers 103 by writing data to the corresponding addresses via write commands.

Alternatively, custom commands can be configured to allow a host system to request the integrated circuit memory chip 101 to set the content of the driver control registers 103.

Optionally, the integrated circuit memory chip 101 can be configured to operate in a training mode in which the pin driver 105 is controlled by the controller 107 to drive a signal on the pin using different setting of the registers 103. The host system can select a desirable setting by sending a signal or command to the integrated circuit memory chip 101 when a current setting is desirable.

Optionally, an Artificial Intelligence (AI) engine can be configured to predict optimized settings for the spread spectrum sequence 117, the strength, the delay, and/or the slew rate, based on the current pattern of communications through the pins (e.g., 119) and the operating conditions of the system having the integrated circuit memory chip 101 as a component.

For example, the Artificial Intelligence (AI) engine can be trained, e.g., via an artificial neural network, to establish a predictive model. The model can predict the optimized spread spectrum sequence 117, strength, delay, slew rate, etc. to minimize a cost function that is configured to reduce energy consumption, Electromagnetic Interference (EMI), and error rate associated with the communication using the signals driven by the pin driver 105.

For example, during a training period, signals representative of different patterns of data can be driven by the pin drivers (e.g., 105) using different settings for the strength, the delay, the slew rate, etc. The resulting reductions in energy consumption and Electromagnetic Interference (EMI) can be measured; and the errors detected at the receiving device can be detected via an Error Correction Code (ECC) technique. From the training data, combinations of settings for the driver control registers 103 can be computed to evaluate the cost function; and the optimized combinations for different data patterns can be identified. The identified combinations can be used to train the predictive model to predict optimized settings for the driver control registers 103 in view of a current set of data to be transmitted via the signals driven by the pin drivers (e.g., 105).

The trained predictive model can be installed in the integrated circuit memory chip 101 to generate settings for the driver control registers 103 in view of the data to be transmitted from the memory cell array 109 through the pins (e.g., 119) to the host system.

Figure 2:
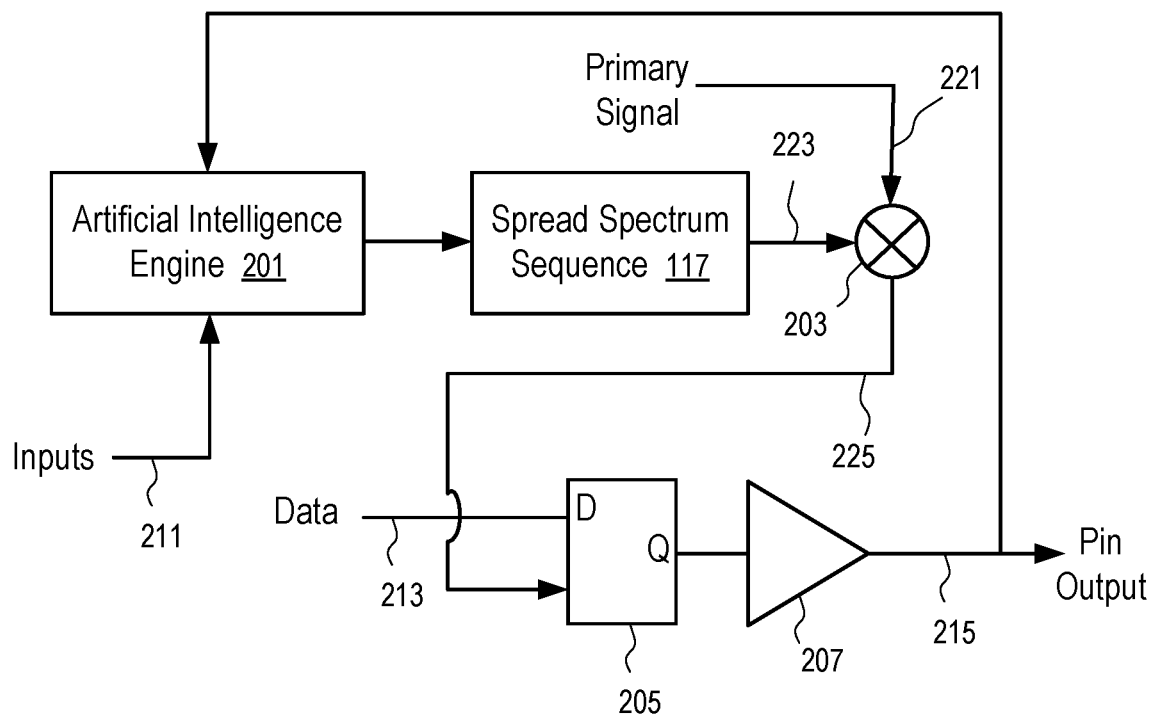
FIG. 2 illustrates an implementation of a spread spectrum signal driver of a pin of an integrated circuit chip according to one embodiment.

FIG. 2 illustrates an implementation of a spread spectrum signal driver of a pin of an integrated circuit chip according to one embodiment. For example, the technique of FIG. 2 can be implemented in the integrated circuit memory chip 101 of FIG. 1.

In FIG. 2, a pin driver is configured to generate a pin output 215 (e.g., on pin 119 in the Integrated Circuit Memory Chip 101 of FIG. 1). The pin driver has a mixer 203, a flip flop 205, and a buffer 207. Digital data 213 to be transmitted via the pin output 215 is provided to an input to the flip flop 205. The trigger of the flip flop 205 is controlled by the output 225 of the mixer 203, which mixes a primary signal 221 (e.g., a clock signal) and a spreading signal 223 controlled by the setting of spread spectrum sequence 117. Since the trigger of the flip flop 205 is controlled by the primary signal 221 modified by the spreading signal 223, the energy of the signal on the pin output 215 is relatively evenly distributed on a wider frequency range, instead of concentrating and peaking at a particular frequency as the primary signal 221.

In FIG. 2, the spread spectrum sequence 117 is generated by an Artificial Intelligence (AI) engine 201. For example, the Artificial Intelligence (AI) engine 201 can have an artificial neural network that can be trained to predict an optimized spread spectrum sequence 117 to reduce electromagnetic emission level based on inputs 211 identifying a current operating condition of the system.

During a training period, the Artificial Intelligence (AI) engine 201 can vary the use of different spread spectrum sequences 117 under various operating conditions. The resulting electromagnetic emission level associated with the use of the different spread spectrum sequences 117 can be measured. In some implementations, the pin output 215 is analyzed by the Artificial Intelligence (AI) engine 201 to determine the impact of the spread spectrum sequence 117 on the signal characteristics on the pin output 215 and thus the contribution of the electromagnetic emission by the pin output 215. From the training data, optimized settings for the spread spectrum sequence 117 can be identified for various operating conditions; and the artificial neural network of the Artificial Intelligence (AI) engine 201 can be trained, using a supervised machine learning technique, to predict an optimized setting for the spread spectrum sequences 117 for a given operating condition represented by the inputs 211, such as a pattern of data to be transmitted over a set of pins (e.g., 119) of the integrated circuit memory chip 101.

Figure 3:
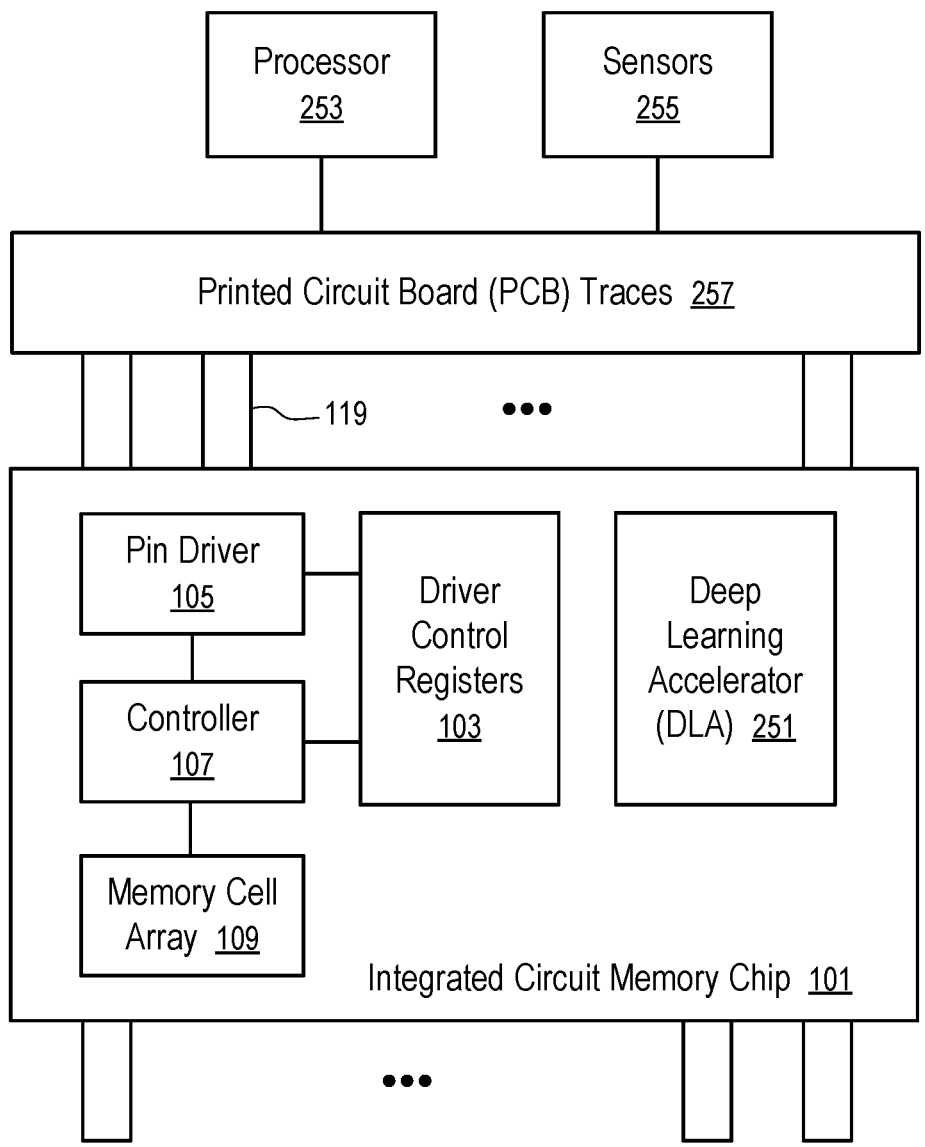
FIG. 3 shows a system having programmable spread spectrum pin drivers according to one embodiment.

FIG. 3 shows a system having programmable spread spectrum pin drivers according to one embodiment. For example, the integrated circuit memory chip 101 of FIG. 1 can be used in the system of FIG. 3; and the programmable pin driver of FIG. 2 can be used for the pins of the integrated circuit memory chip 101 and/or the processor 253.

In FIG. 3, the processor 253 and the integrated circuit memory chip 101 are connected via printed circuit board (PCB) traces 257. The system has sensors 255 to measure parameters representing the operational conditions of the system that are relevant to the configurations of the characteristics of signals driven onto the traces 257.

For example, the sensors 255 can measure the level of Electromagnetic Interference (EMI) at various locations in a system of FIG. 3. The Electromagnetic Interference (EMI) can be the result of data transmission between the processor 253 and the integrated circuit memory chip 101 and/or other components.

For example, the pin driver 105 can be controlled by driver control registers 103 to customize the spread spectrum signals driven on the pin 119. Further, the driver control registers 103 can specify the strength, delay, slew rate, and/or other aspects of the signals driven by the pin driver 105 onto the traces 257 connected to the pin 119.

Optionally, the integrated circuit memory chip 101 has a deep learning accelerator 251 having processing units configured to perform matrix operations of computations of an artificial neural network. During a training period, the controller 107 can use different settings for the pin driver 105 to drive signals on the pin 119. The combinations of driver settings and their effects on the sensor measurements, as well as errors in the data transmitted via the signals driven on the pin 119, can be used to identify settings that optimize a cost function for the system in reducing energy consumption, Electromagnetic Interference (EMI), data transmission error, etc. The identified settings in association with their data transmission patterns and the working condition parameters can be used to train an artificial neural network (e.g., using a supervised machine learning technique) to predict the optimized settings for a given data transmission pattern and working condition parameters. Subsequently, the settings of the driver control registers 103 can be adjusted according to the predictions of the trained artificial neural network. Further, during the use of the settings selected using the artificial neural network, the error rates and the sensor measurements can be further collected to further train the artificial neural network to improve its prediction accuracy in optimization of the cost function.

Integrated circuit memory chips can be used in a memory sub-system. Examples of storage devices and memory modules as memory sub-systems are described below in conjunction with FIG. 5. In general, a host system can utilize a memory sub-system that includes one or more components, such as memory devices that store data. The host system can provide data to be stored at the memory sub-system and can request data to be retrieved from the memory sub-system.

Figure 4:
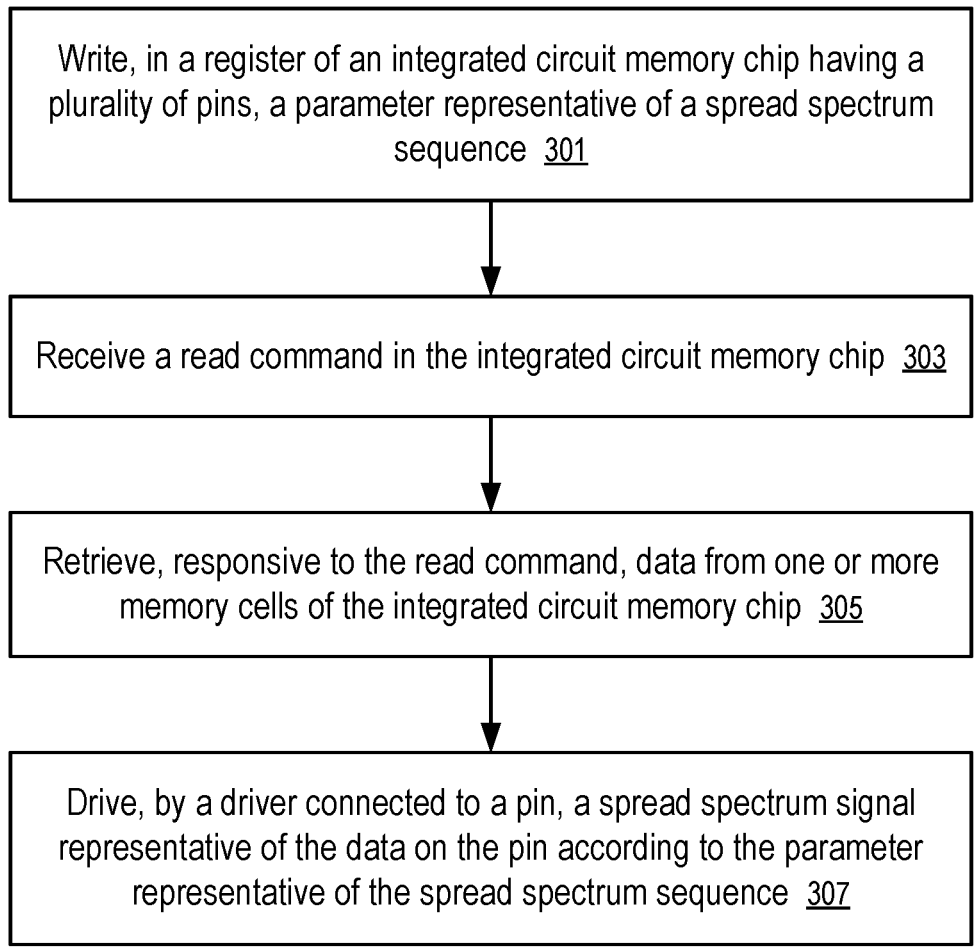
FIG. 4 shows a method to control signal spectrum at a pin of an integrated circuit chip according to one embodiment.

FIG. 4 shows a method to control signal spectrum at a pin of an integrated circuit chip according to one embodiment. The methods can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. In some embodiments, the method is performed at least in part by the controller 409 of FIG. 5, processing logic in the memory device 419 of FIG. 6, and/or the processing device 403 of the host system 401 of FIG. 5. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

For example, the method of FIG. 4 can be performed by a driver manager in an integrated circuit memory chip 101 of FIG. 1 or FIG. 3, with a driver implemented using a technique of FIG. 2.

At block 301, a driver manager writes, in a register 103 of an integrated circuit memory chip 101 having a plurality of pins (e.g., 119), a parameter representative of a spread spectrum sequence 117.

For example, the integrated circuit memory chip 101 has an integrated circuit package configured to enclose the chip. The plurality of pins (e.g., 119) are configured to connect first circuits enclosed within the integrated circuit package to second circuits located outside of the integrated circuit package. For example, the second circuits can include printed circuit board traces connecting the pins (e.g., 119) to a processor 253; and the first circuits can include a memory cell array 109, pin drivers (e.g., 105), a controller 107, registers 103, and/or a deep Learning Accelerator 251. The integrated circuit memory chip 101 has a memory cell array 109.

At block 303, the integrated circuit memory chip 101 receives a read command.

For example, the integrated circuit memory chip 101 can have one or more memory cell arrays 109 formed on one or more integrated circuit dies. The memory cells in an array 109 can be programmed to have states representative of data stored in the memory cells. In response to the read commands, the integrated circuit memory chip 101 can determine the states of memory cells addressed by the read command to retrieve/recover the data represented by the states of the memory cells.

At block 305, responsive to the read command, the integrated circuit memory chip 101 retrieves data from one or more memory cells of the integrated circuit memory chip 101.

At block 307, a pin driver 105, connected to a pin 119 of the integrated circuit memory chip 101, drives a spread spectrum signal representative of the data on the pin 119 according to the parameter representative of the spread spectrum sequence 117.

For example, the driver control registers 103 can include a first register programmable to store a first parameter identifying a spread spectrum sequence 117 to generate the spread spectrum signals driven by the pin driver 105 onto a first pin 119.

In some implementations, the spread spectrum signals driven by the pin driver 105 according to the spread spectrum sequence 117 are representative of data of a predetermined bit value (e.g., 1) that is independent of the first parameter identifying a spread spectrum sequence 117. Changing the spread spectrum sequence 117 does not change the bit value represented by the spread spectrum signals. However, changing the spread spectrum sequence 117 can change the electromagnetic emission associated with the transmission of the bit value through the first pin 119.

In other implementations, the spread spectrum signals are further configured to encode data to be transmitted over the first pin 119. Thus, the first pin 119 can be used to provide a serial communication link to communicate data via the spread spectrum signals that not only alters the electromagnetic emission profile of the first pin 119, but also improves the communications bandwidth over the first pin 119. For example, the first pin 119 can be connected via some of the printed circuit board traces 257 to another integrated circuit chip as a first high speed serial communication link; and a second pin can be connected via some of the printed circuit board traces 257 to a further integrated circuit chip as a second high speed serial communication link.

The pin driver 105 can include a mixer 203 that is connected to receive a primary signal 221 (e.g., a clock signal) and a spreading signal 223 controlled by the spread spectrum sequence 117 for generating the spread spectrum signals on the pin output 215. For example, a flip flop 205 of the pin driver 105 can have a first input connected to receive data 213 to be transmitted via the spread spectrum signals over the first pin 119, and a second input connected to receive an output 225 of the mixer 203. A buffer 207 of the pin driver 105 drives the pin output 215 according to the output of the flip flop 205.

Optionally, the driver control register 103 can include a second register programmable to store a second parameter; and wherein a strength, delay, and/or slew rate of the spread spectrum signals driven by the pin driver 105 is controlled by the second parameter.

Optionally, different pins (e.g., 119) are driven by pin drivers (e.g., 105) controlled by separate driver control registers 103. Alternatively, a group of pins (e.g., 119) can be drive by a group of pin drivers (105) that share a register 103 and/or a spread spectrum sequence 117.

A command can be sent (e.g., from a processor 253) to set the content in the driver control registers 103 (e.g., to reduce electromagnetic emissions at a frequency) and/or to reduce error rate in transmitting data using the spread spectrum signals.

Optionally, the integrated circuit memory chip 101 has an Artificial Intelligence (AI) engine that can predict a setting for the driver control registers 103 (e.g., spread spectrum sequence 117) that optimizes a cost function for a current operating condition of the system or apparatus in which the integrated circuit memory chip 101 is installed.

For example, the system or apparatus can include a sensor 255 that generates a sensor measurement indicative of a current operating condition. Further, the data to be transmitted over the pins (e.g., 119) can be analyzed to identify a characteristics/pattern of the current operating condition for transmitting data over the printed circuit board traces 257. An artificial neural network of the Artificial Intelligence (AI) engine 201 can be trained to predict the spread spectrum sequence 117 that optimizes a cost function for the current operating condition identified by a sensor measurement from the sensor and a pattern of data to be transmitted. The cost function can be configured to reduce energy consumption, electromagnetic interference, and errors in data transmitted via signals driven by the pin driver 105. For example, the sensors 255 can be used to measure electromagnetic emission levels resulting from different spread spectrum sequences (e.g., 117) used to drive signals on the pin 119 under different operating conditions; and a predictive module can be generated for the Artificial Intelligence (AI) engine 201 based on the measured electromagnetic emission levels.

Figure 5:
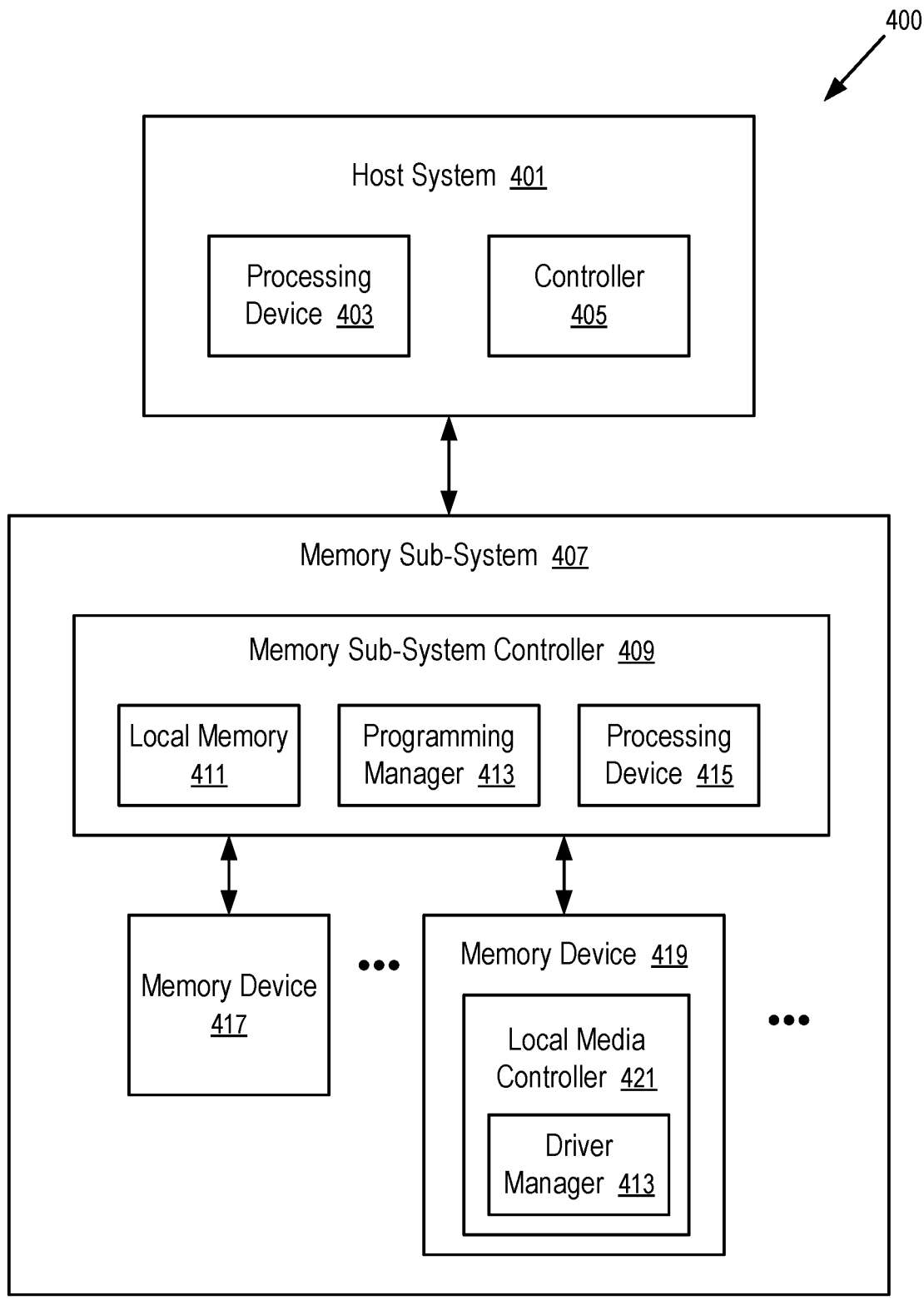
FIG. 5 illustrates an example computing system having a memory sub-system in accordance with some embodiments of the present disclosure.

FIG. 5 illustrates an example computing system 400 that includes a memory sub-system 407 in accordance with some embodiments of the present disclosure. The memory sub-system 407 can include media, such as one or more volatile memory devices (e.g., memory device 417), one or more non-volatile memory devices (e.g., memory device 419), or a combination of such.

A memory sub-system 407 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 400 can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The computing system 400 can include a host system 401 that is coupled to one or more memory sub-systems 407. FIG. 5 illustrates one example of a host system 401 coupled to one memory sub-system 407. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 401 can include a processor chipset (e.g., processing device 403) and a software stack executed by the processor chipset. The processor chipset can include one or more cores, one or more caches, a memory controller (e.g., controller 405) (e.g., NVDIMM controller), and a storage protocol controller (e.g., PCIe controller, SATA controller). The host system 401 uses the memory sub-system 407, for example, to write data to the memory sub-system 407 and read data from the memory sub-system 407.

The host system 401 can be coupled to the memory sub-system 407 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system 401 and the memory sub-system 407. The host system 401 can further utilize an NVM Express (NVMe) interface to access components (e.g., memory devices 419) when the memory sub-system 407 is coupled with the host system 401 by the PCIe interface. The physical host interface can provide an interface for passing control, address, data, and other signals between the memory sub-system 407 and the host system 401. FIG. 5 illustrates a memory sub-system 407 as an example. In general, the host system 401 can access multiple memory sub-systems via a same communication connection, multiple separate communication connections, and/or a combination of communication connections.

The processing device 403 of the host system 401 can be, for example, a microprocessor, a central processing unit (CPU), a processing core of a processor, an execution unit, a System on a Chip (SoC), etc. In some instances, the controller 405 can be referred to as a memory controller, a memory management unit, and/or an initiator. In one example, the controller 405 controls the communications over a bus coupled between the host system 401 and the memory sub-system 407. In general, the controller 405 can send commands or requests to the memory sub-system 407 for desired access to memory devices 419, 417. The controller 405 can further include interface circuitry to communicate with the memory sub-system 407. The interface circuitry can convert responses received from the memory sub-system 407 into information for the host system 401.

The controller 405 of the host system 401 can communicate with the controller 409 of the memory sub-system 407 to perform operations such as reading data, writing data, or erasing data at the memory devices 419, 417 and other such operations. In some instances, the controller 405 is integrated within the same package of the processing device 403. In other instances, the controller 405 is separate from the package of the processing device 403. The controller 405 and/or the processing device 403 can include hardware such as one or more integrated circuits (ICs) and/or discrete components, a buffer memory, a cache memory, or a combination thereof. The controller 405 and/or the processing device 403 can be a microcontroller, special purpose logic circuitry (e.g., a field programmable gate array (FPGA), an application specific integrated circuit (ASIC), etc.), or another suitable processor.

The memory devices 419, 417 can include any combination of the different types of non-volatile memory components and/or volatile memory components. The volatile memory devices (e.g., memory device 417) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 419 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 419 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 419 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 419 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 409 (or controller 409 for simplicity) can communicate with the memory devices 419 to perform operations such as reading data, writing data, or erasing data at the memory devices 419 and other such operations (e.g., in response to commands scheduled on a command bus by controller 405). The controller 409 can include hardware such as one or more integrated circuits (ICs) and/or discrete components, a buffer memory, or a combination thereof. The hardware can include digital circuitry with dedicated (e.g., hard-coded) logic to perform the operations described herein. The controller 409 can be a microcontroller, special purpose logic circuitry (e.g., a field programmable gate array (FPGA), an application specific integrated circuit (ASIC), etc.), or another suitable processor.

The controller 409 can include a processing device 415 (e.g., processor) configured to execute instructions stored in a local memory 411. In the illustrated example, the local memory 411 of the controller 409 includes an embedded memory configured to store instructions for performing various processes, operations, logic flows, and routines that control operation of the memory sub-system 407, including handling communications between the memory sub-system 407 and the host system 401.

In some embodiments, the local memory 411 can include memory registers storing memory pointers, fetched data, etc. The local memory 411 can also include read-only memory (ROM) for storing micro-code. While the example memory sub-system 407 in FIG. 5 has been illustrated as including the controller 409, in another embodiment of the present disclosure, a memory sub-system 407 does not include a controller 409, and can instead rely upon external control (e.g., provided by an external host, or by a processor or controller separate from the memory sub-system).

In general, the controller 409 can receive commands or operations from the host system 401 and can convert the commands or operations into instructions or appropriate commands to achieve the desired access to the memory devices 419. The controller 409 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 419. The controller 409 can further include host interface circuitry to communicate with the host system 401 via the physical host interface. The host interface circuitry can convert the commands received from the host system into command instructions to access the memory devices 419 as well as convert responses associated with the memory devices 419 into information for the host system 401.

The memory sub-system 407 can also include additional circuitry or components that are not illustrated. In some embodiments, the memory sub-system 407 can include a cache or buffer (e.g., DRAM) and address circuitry (e.g., a row decoder and a column decoder) that can receive an address from the controller 409 and decode the address to access the memory devices 419.

In some embodiments, the memory devices 419 include local media controllers 421 that operate in conjunction with the memory sub-system controller 409 to execute operations on one or more memory cells of the memory devices 419. An external controller (e.g., memory sub-system controller 409) can externally manage the memory device 419 (e.g., perform media management operations on the memory device 419). In some embodiments, a memory device 419 is a managed memory device, which is a raw memory device combined with a local controller (e.g., local media controller 421) for media management within the same memory device package. An example of a managed memory device is a managed NAND (MNAND) device.

The controller 409 and/or a memory device 419 can include a driver manager 413 configured to control signal spectrum at a pin of an integrated circuit chip. In some embodiments, the controller 409 in the memory sub-system 407 and/or the controller 421 in the memory device 419 can include at least a portion of the driver manager 413. In other embodiments, or in combination, the controller 405 and/or the processing device 403 in the host system 401 includes at least a portion of the driver manager 413. For example, the controller 409, the controller 405, and/or the processing device 403 can include logic circuitry implementing the driver manager 413. For example, the controller 409, or the processing device 403 (e.g., processor) of the host system 401, can be configured to execute instructions stored in memory for performing the operations of the driver manager 413 described herein. In some embodiments, the driver manager 413 is implemented in an integrated circuit chip disposed in the memory sub-system 407. In other embodiments, the driver manager 413 can be part of firmware of the memory sub-system 407, an operating system of the host system 401, a device driver, or an application, or any combination therein.

For example, the driver manager 413 implemented in the controller 409 and/or the controller 421 can be configured via instructions and/or logic circuit to control signal spectrum at a pin of an integrated circuit chip.

Figure 6:
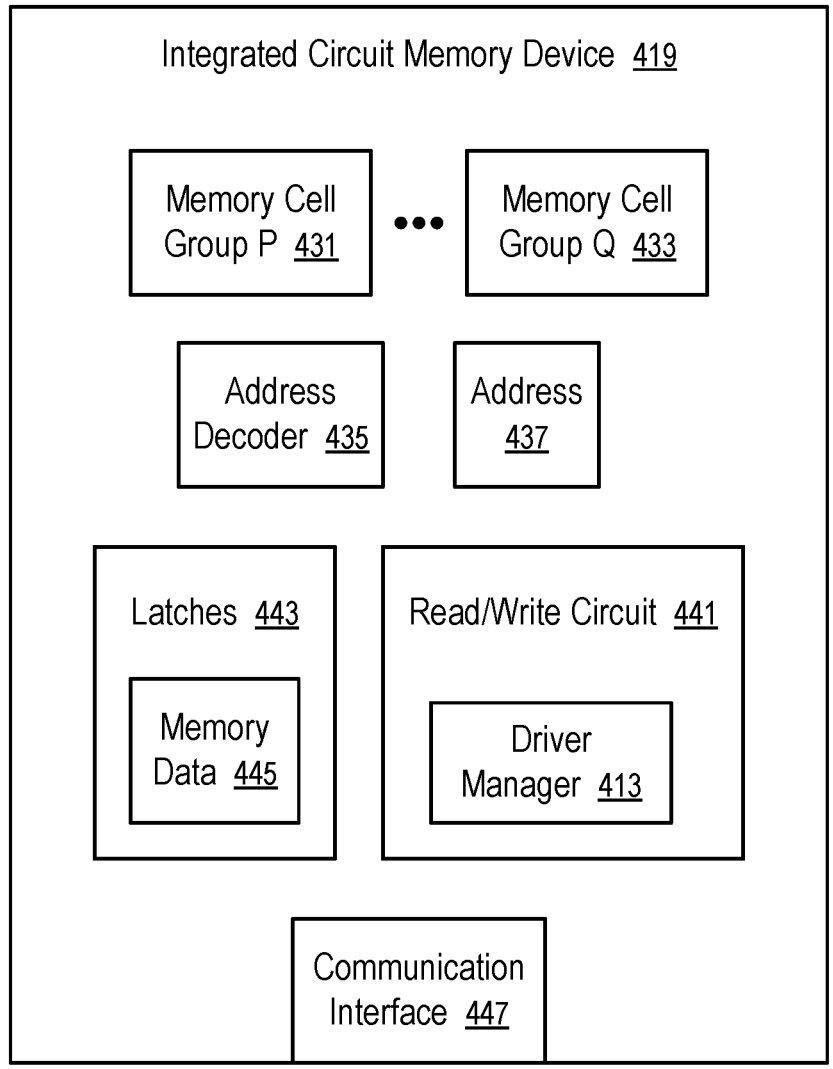
FIG. 6 illustrates an integrated circuit memory device configured according to one embodiment.

FIG. 6 illustrates an integrated circuit memory device configured according to one embodiment. For example, the memory devices 419 in the memory sub-system 407 of FIG. 5 can be implemented using the integrated circuit memory device 419 of FIG. 6.

The integrated circuit memory device 419 can be enclosed in a single integrated circuit package. The integrated circuit memory device 419 includes multiple groups 431, . . . , 433 of memory cells that can be formed in one or more integrated circuit dies. A typical memory cell in a group 431 (or group 433) can be programmed to store one or more bits of data.

Some of the memory cells in the integrated circuit memory device 419 can be configured to be operated together for a particular type of operations. For example, memory cells on an integrated circuit die can be organized in planes, blocks, and pages. A plane contains multiple blocks; a block contains multiple pages; and a page can have multiple strings of memory cells. For example, an integrated circuit die can be the smallest unit that can independently execute commands or report status; identical, concurrent operations can be executed in parallel on multiple planes in an integrated circuit die; a block can be the smallest unit to perform an erase operation; and a page can be the smallest unit to perform a data program operation (to write data into memory cells). Each string has its memory cells connected to a common bitline; and the control gates of the memory cells at the same positions in the strings in a block or page are connected to a common wordline. Control signals can be applied to wordlines and bitlines to address the individual memory cells.

The integrated circuit memory device 419 has a communication interface 447 to receive a command having an address 437 from the controller 409 of a memory sub-system 407, retrieve memory data 445 from memory cells identified by the memory address 437, and provide at least the memory data 445 as part of a response to the command. Optionally, the memory device 419 may decode the memory data 445 (e.g., using an error-correcting code (ECC) technique) and provide the decoded data as part of a response to the command. An address decoder 435 of the integrated circuit memory device 419 converts the address 437 into control signals to select a group of memory cells in the integrated circuit memory device 419; and a read/write circuit 441 of the integrated circuit memory device 419 performs operations to determine the memory data 445 stored in the memory cells at the address 437.

The integrated circuit memory device 419 has a set of latches 443, or buffers, to hold memory data 445 temporarily while the read/write circuit 441 is programming the threshold voltages of a memory cell group (e.g., 431 or 433) to store data, or evaluating the threshold voltages of a memory cell group (e.g., 431 or 433) to retrieve data.

Figure 7:
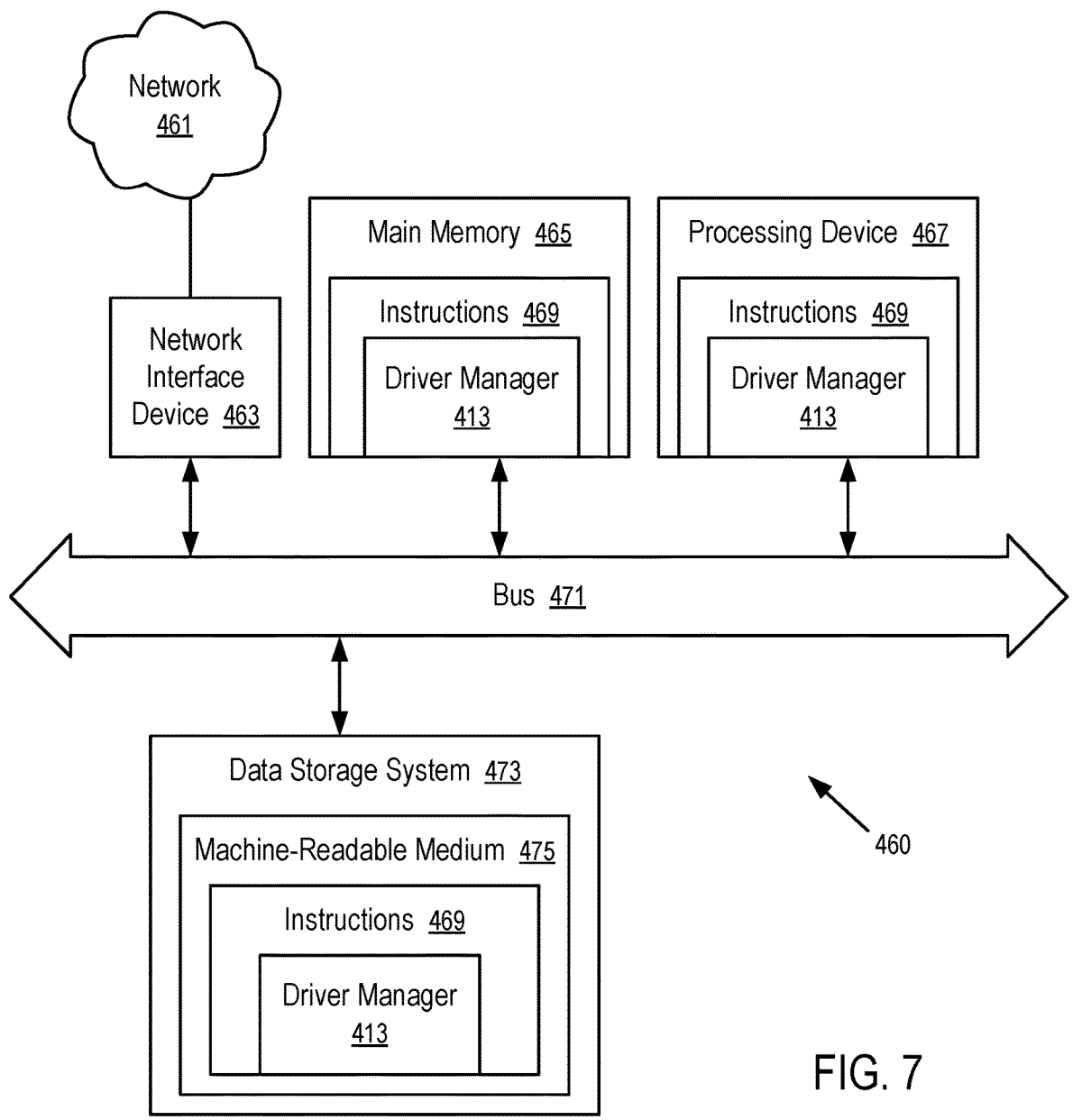
FIG. 7 is a block diagram of an example computer system in which embodiments of the present disclosure can operate.

FIG. 7 illustrates an example machine of a computer system 460 within which a set of instructions, for causing the machine to perform any one or more of the methodologies discussed herein, can be executed. In some embodiments, the computer system 460 can correspond to a host system (e.g., the host system 401 of FIG. 5) that includes, is coupled to, or utilizes a memory sub-system (e.g., the memory sub-system 407 of FIG. 5) or can be used to perform the operations of a driver manager 413 (e.g., to execute instructions to perform operations corresponding to the driver manager 413 described with reference to FIG. 1 to FIG. 6). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 460 includes a processing device 467, a main memory 465 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 473, which communicate with each other via a bus 471 (which can include multiple buses).

The processing device 467 can be one or more general-purpose processing devices such as a microprocessor, a central processing unit, or the like. More particularly, the processing device 467 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 467 can also be one or more special-purpose processing devices such as an application specific integrated circuit (ASIC), a field programmable gate array (FPGA), a digital signal processor (DSP), network processor, or the like. The processing device 467 is configured to execute instructions 469 for performing the operations and steps discussed herein. The computer system 460 can further include a network interface device 463 to communicate over the network 461.

The data storage system 473 can include a machine-readable medium 475 (also known as a computer-readable medium) on which is stored one or more sets of instructions 469 or software embodying any one or more of the methodologies or functions described herein. The instructions 469 can also reside, completely or at least partially, within the main memory 465 and/or within the processing device 467 during execution thereof by the computer system 460, the main memory 465 and the processing device 467 also constituting machine-readable storage media. The machine-readable medium 475, data storage system 473, and/or main memory 465 can correspond to the memory sub-system 407 of FIG. 5.

In one embodiment, the instructions 469 include instructions to implement functionality corresponding to a driver manager 413 (e.g., the driver manager 413 described with reference to FIG. 1 to FIG. 6). While the machine-readable medium 475 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A device, comprising:
    an integrated circuit package;
    a set of pins configured to connect first circuits enclosed within the integrated circuit package to second circuits located outside of the integrated circuit package;
    memory cells enclosed within the integrated circuit package;
    a driver programmable via a first setting received from a host system, the driver enclosed within the integrated circuit package and configured to generate spread spectrum signals according to the first setting and transmit to a first pin, among the set of pins, the spread spectrum signals representative of data retrieved from the memory cells; and
    registers enclosed within the integrated circuit package and programmable to store the first setting based at least in part on signaling received from the host system.

2. The device of claim 1, wherein the registers include a first register programmable to store a first parameter identifying a spread spectrum sequence to generate the spread spectrum signals.

3. The device of claim 2, wherein the driver includes a mixer; the mixer is connected to receive a primary signal and a spreading signal controlled by the spread spectrum sequence to generate the spread spectrum signals.

4. The device of claim 3, wherein the driver includes a flip flop having:
    a first input connected to receive data to be transmitted via the spread spectrum signals over the first pin; and
    a second input connected to receive an output of the mixer.

5. The device of claim 4, wherein the driver further includes a buffer connected to drive the spread spectrum signals on the first pin according to an output of the flip flop.

6. The device of claim 5, wherein the registers include a second register programmable to store a second parameter; and wherein a strength, delay, or slew rate of the spread spectrum signals driven by the driver is controlled by the second parameter.

7. The device of claim 6, wherein the spread spectrum signals are representative of data of a predetermined bit value that is independent of the first parameter.

8. The device of claim 6, wherein the spread spectrum signals are further configured to encode data to be transmitted over the first pin.

9. The device of claim 8, wherein the first pin is configured to provide a serial communication link to communicate data via the spread spectrum signals.

10. An apparatus, comprising:
    a sensor;
    a printed circuit board having a plurality of traces;
    a first integrated circuit chip connected to the traces; and a second integrated circuit chip mounted on the printed circuit board and having a plurality of pins connected to the traces, the second integrated circuit chip having a first driver programmable to adjust a frequency spread spectrum signal driven onto a first pin, among the plurality of pins, wherein the apparatus is configured to program the first driver based at least in part on a measurement from the sensor.

11. The apparatus of claim 10, wherein the second integrated circuit chip includes a register configured to store a spread spectrum sequence to control adjustment of the frequency spread spectrum signal driven onto the first pin by the first driver.

12. The apparatus of claim 11, wherein the second integrated circuit chip further includes a second driver programmable, via the register, to adjust a frequency spread spectrum signal driven onto a second pin of the second integrated circuit chip.

13. The apparatus of claim 11, wherein the register is a first register; and the second integrated circuit chip further includes a second driver programmable, via a second register different from the first register, to adjust a frequency spread spectrum signal driven onto a second pin among the plurality of pins of the second integrated circuit chip.

14. The apparatus of claim 13, further comprising:
a third integrated circuit chip connected to the traces, wherein the first pin is connected via the traces to the first integrated circuit chip to form a first serial communication link between the first integrated circuit chip and the second integrated circuit chip, and the second pin is connected via the traces to the third integrated circuit chip to form a second serial communication link between the third integrated circuit chip and the second integrated circuit chip.

15. The apparatus of claim 11, wherein the sensor is configured to measure electromagnetic interference at a location within the apparatus.

16. The apparatus of claim 15, further comprising:
an artificial neural network configured to predict the spread spectrum sequence that optimizes a cost function for an operating condition identified by a measurement from the sensor and a pattern of data to be transmitted from the second integrated circuit chip, wherein the second integrated circuit chip includes a plurality of memory cells storing the data.

17. A method, comprising:
writing, in a register of an integrated circuit memory chip having a plurality of pins, a parameter representative of a spread spectrum sequence;
receiving a read command in the integrated circuit memory chip;
retrieving, responsive to the read command, data from one or more memory cells of the integrated circuit memory chip; and
driving, by a driver connected to a pin, a spread spectrum signal representative of the data on the pin according to the parameter representative of the spread spectrum sequence.

18. The method of claim 17, further comprising:
generating a spreading signal according to the spread spectrum sequence; and
mixing the spreading signal and a primary signal to generate a control signal to drive the spread spectrum signal.

19. The method of claim 17, further comprising:
receiving a sensor measurement representative of an operating condition of an apparatus in which the integrated circuit is mounted;
predicting, using an artificial intelligent engine, the spread spectrum sequence to optimize a cost function for the operating condition.

20. The method of claim 19, further comprising:
determining electromagnetic emission levels resulting from different spread spectrum sequences used to drive signals on the pin; and
generating a predictive module for the artificial intelligent engine based on the electromagnetic emission levels;
wherein the cost function is configured to reduce energy consumption, electromagnetic interference, and errors in data transmitted via signals driven by the driver.

* * * * *